United States Patent
Hatton et al.

(10) Patent No.: US 11,756,320 B2
(45) Date of Patent: Sep. 12, 2023

(54) HIGH-SPEED OCR DECODE USING DEPLETED CENTERLINES

(71) Applicant: Hand Held Products, Inc., Charlotte, NC (US)

(72) Inventors: Edward Hatton, Yarker (CA); H. Sprague Ackley, Seattle, WA (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/652,732

(22) Filed: Feb. 28, 2022

(65) Prior Publication Data

US 2022/0277534 A1 Sep. 1, 2022

Related U.S. Application Data

(60) Continuation of application No. 16/557,373, filed on Aug. 30, 2019, now Pat. No. 11,295,182, which is a division of application No. 15/599,600, filed on May 19, 2017, now Pat. No. 10,438,098.

(51) Int. Cl.
| | |
|---|---|
| *G06V 30/168* | (2022.01) |
| *G06V 30/262* | (2022.01) |
| *G06V 30/146* | (2022.01) |
| *G06F 18/22* | (2023.01) |
| *G06V 30/19* | (2022.01) |
| *G06V 10/74* | (2022.01) |
| *G06V 30/10* | (2022.01) |

(52) U.S. Cl.
CPC ............ *G06V 30/168* (2022.01); *G06F 18/22* (2023.01); *G06V 10/761* (2022.01); *G06V 30/1478* (2022.01); *G06V 30/19067* (2022.01); *G06V 30/274* (2022.01); *G06V 30/10* (2022.01)

(58) Field of Classification Search
USPC .................................................. 382/187, 278
See application file for complete search history.

(56) References Cited

U.S. PATENT DOCUMENTS

| 5,896,464 A | * | 4/1999 | Horiuchi | ............. | G06V 30/155 |
| | | | | | 715/228 |
| 6,125,206 A | * | 9/2000 | Yokota | .................... | G06F 18/28 |
| | | | | | 382/189 |

(Continued)

OTHER PUBLICATIONS

CN Office Action dated Feb. 25, 2023 for CN Application No. 201810479182, 13 page(s).

(Continued)

*Primary Examiner* — Kathleen Y Dulaney
(74) *Attorney, Agent, or Firm* — Alston & Bird LLP (57) ABSTRACT

A method for template matching can include iteratively selecting a template set of points to project over a centerline of a candidate symbol; conducting a template matching analysis; assigning a score to each template set; and selecting a template set with a highest assigned score. For example, the score can depend on proximity of the template points to a center and/or boundaries of a principal tracing path of the symbol. Additionally, one or more template sets having a top rank can be selected for a secondary analysis of proximity of the template points to a boundary of a printing of the symbol. The method can further include using the template with the highest score to interpret the candidate symbol.

20 Claims, 6 Drawing Sheets

(56) References Cited

U.S. PATENT DOCUMENTS

2008/0187240 A1* 8/2008 Takebe ................ G06V 30/414
                                                    382/278
2012/0183172 A1* 7/2012 Stroila ................ G06V 30/142
                                                    382/100

OTHER PUBLICATIONS

English Translation of CN Office Action dated Feb. 25, 2023 for CN Application No. 201810479182, 14 page(s).

* cited by examiner

HIGH-SPEED OCR DECODE USING DEPLETED CENTERLINES

CROSS-REFERENCE TO RELATED APPLICATIONS

This application is a continuation of U.S. patent application Ser. No. 16/557,373, filed Aug. 30, 2019, which is a divisional of U.S. patent application Ser. No. 15/599,600, filed May 19, 2017 (now U.S. Pat. No. 10,438,098), which is incorporated herein by reference in its entirety.

FIELD OF THE INVENTION

The present invention relates to optical character recognition using image-processing techniques, and more particularly to methods for template matching and symbol interpretation.

BACKGROUND

Generally speaking, optical character recognition (OCR) attempts to decode symbols using image-processing techniques. Typically, such an approach is time-consuming, as it involves moving outline templates around, and performing calculations for each position. A high-speed method capable of efficient optical character recognition is needed.

Several attempts have been made to improve optical character recognition. For example, U.S. Pat. No. 5,317,652 by Chatterjee discloses a character recognition system implementing concurrent processing and vector correlation. Specifically, a character image in a buffer is vector-correlated with character templates represented as discrete character skeletons comprised of dots. Although the reference discloses comparison of dots around a centerline template, it does not mention assigning template scores based on the number of dots inside or outside the printed character. U.S. Pat. No. 7,724,958 by Walch discloses a biometric handwriting identification system for converting characters and a writing sample into mathematical graphs, followed by using optical character recognition to identify features in the handwriting sample. The reference mentions using OCR to compare centerlines of stored and current images. However, to score a character match the template is superimposed over the actual image, and pixels of the actual image are then analyzed. The method does not use an analysis of a limited set of points to score a character match. U.S. Pat. No. 6,628,808 by Bach et al. discloses a method of verifying a scanned image using a topological analysis. To score a character match at a given candidate location, a template is superimposed over an actual image, and pixels on the actual image falling beneath the centerline pixels on the template are analyzed. Similar to U.S. Pat. No. 7,724,958, the method relies on pixel analysis, and does not mention centerline analysis conducted with a limited set of points, and may therefore be rather time-consuming.

Therefore, a need exists for a quick and efficient template-matching method having OCR decoding time comparable to barcode scanning time.

SUMMARY

Accordingly, the present invention embraces methods for template matching and symbol interpretation.

In an exemplary embodiment, a method for character interpretation includes iteratively selecting a centerline template to cast over a character; determining positions of each member of the centerline template with respect to a principal tracing path of the character; assessing score of the projected template; selecting a centerline template having highest score, and interpreting the character using the selected template.

In another exemplary embodiment, a method for template matching includes iteratively selecting a template set of points to project over a centerline of a candidate character; conducting a template matching analysis, and assigning a score to each template; and selecting a template set with a highest assigned score.

In yet another exemplary embodiment, the present invention embraces a method for symbol recognition. The method includes selecting a point array, and projecting it onto an image of a symbol; determining a rank of the array based on a primary analysis of positions of array points with respect to a printing of the symbol; repeating the process to assign a rank to each point array of a set of point arrays; selecting one or more point arrays having a top rank to conduct a secondary analysis of proximity of the array points to a boundary of the printing of the symbol; and using results of the secondary analysis to select a point array for symbol recognition.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces methods for optical character recognition (OCR) using image-processing techniques.

Figure 1A:
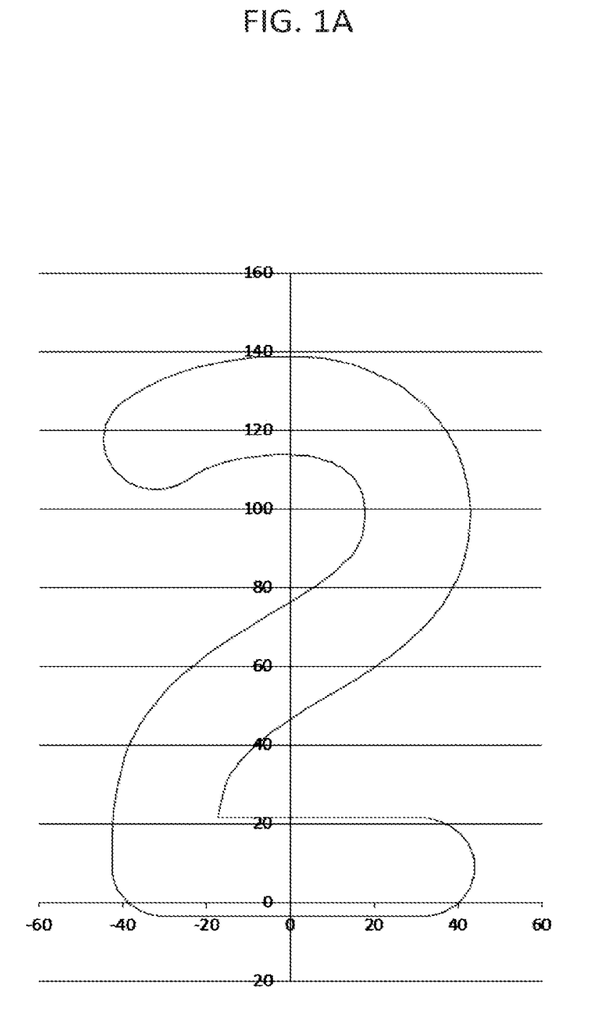
FIG. 1A schematically depicts an exemplary embodiment of typical template for OCR decoding.

OCR decoding described in the prior art often comprises a template-match algorithm where an outline of each character is moved around a candidate character until a best fit is obtained. The fit may then be scored as to how much of the character is inside the outline. The template with the best score is considered the decode of the text character. FIG. 1A shows a typical template that may be used for OCR decoding, namely an OCRB font character "2". The scale is in 2 micron increments, e.g., "100" on the Y-axis is 2 mm from (0, 0). The template comprises approximately 200 points, which results in high processing burden. While some template algorithms may use fewer points and/or vectors, the improvement in processing efficiency is not significant.

Figure 1B:
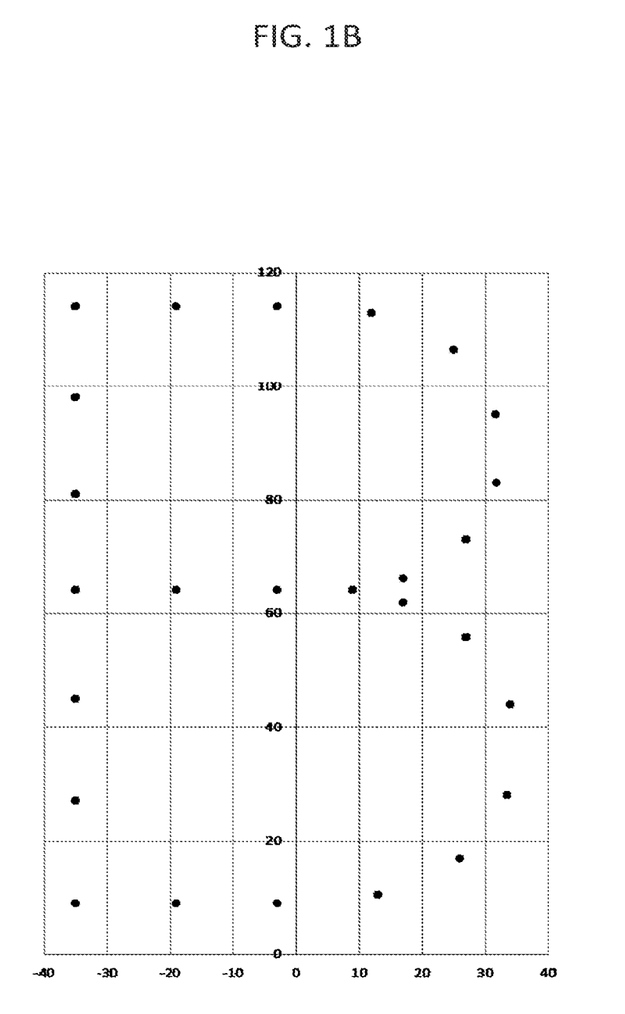
FIG. 1B schematically depicts an exemplary embodiment of a depleted centerline template.

On the contrary, the present invention, while still using the template method, focuses on the character centerline, thus noticeably reducing the required number of points. Additionally, if a depleted centerline is used, the number of points can be as low as about 20. FIG. 1B shows an exemplary embodiment of a depleted centerline template.

The template is an OCRB font character "B". A similar centerline template may be used for other fonts. The resulting vast reduction in the number of points may lead to significantly improved processing time, compared to the conventional outline template methods.

In the template outline methods that include character scores, printed matter outside the template may lead to lower scores. While the centerline method of the present invention can have this feature also, it is possible for part of the centerline template to be "just barely" in a character and still score well in that part, when in fact, the template is not an optimal match.

Figure 1C:
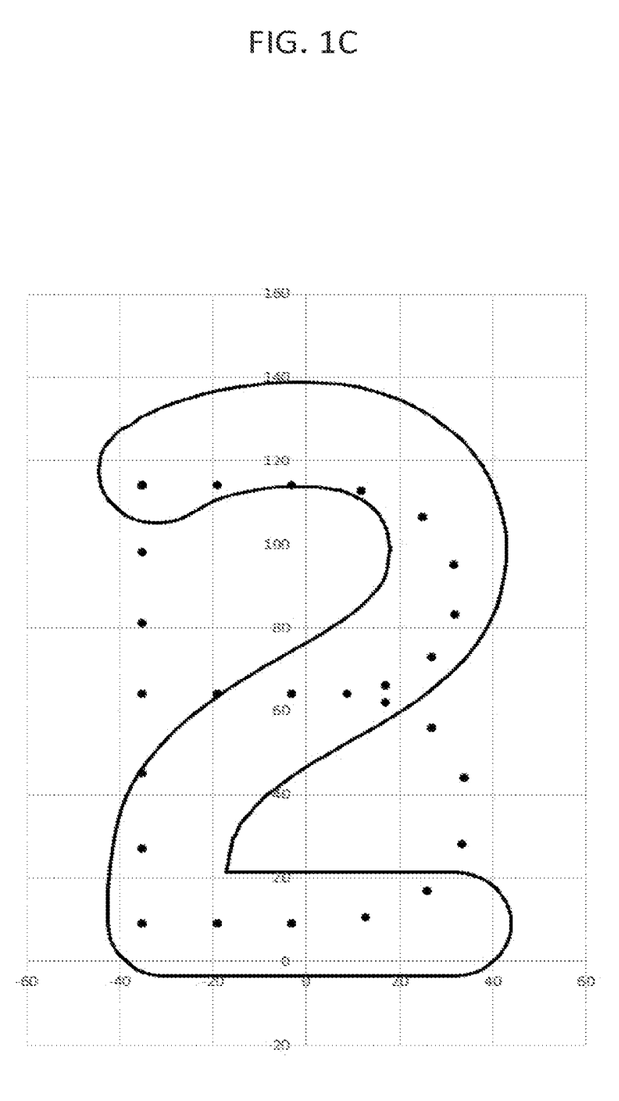
FIG. 1C schematically depicts a combination of templates in FIGS. 1A and 1B plotted on the same axes.

FIG. 1C shows an image where the templates in FIGS. 1A and 1B are plotted on the same axis, so that the centerline of the character "B" is overlaid on the template-outline of the "2" (note that in the OCRB set, all the numerals are taller than all the alpha characters by about 10%). Assuming the "2" was perfectly printed within the template boundaries, one can see that there are several places where the "B" centerline may yield a positive result, although the template centerline is near the edge of the character. For example, the entire top of the "B" centerline falls within the printed "2", yet it is far from the center of the "2". Similarly, the same issue is true for the points forming a bottom-left vertical line of the "B". To deemphasize these types of overlaps, while maintaining the good parts, such as the points forming a bottom straight line of the "B", several solutions are possible.

For example, to further improve the match while taking only a small amount of processing power, the method can include adding a parameter to the centerline score describing how close to a character boundary the centerline is. For instance, the top of the "B" is very close to a character boundary, whereas the bottom straight line formed by the points of the template is approximately equidistant from two character boundaries.

Additionally, for character centerline templates with a reasonably good score, a secondary calculation can be performed. For example, the "B" has a moderate score with the "2", and would likely also have a moderate score with an "8" and an "E". Therefore, after the primary centerline template processing is complete (which may be quite fast), the top few match candidates can be submitted for the secondary check of boundary proximity. Such an approach may produce results comparable to those acquired with an outline template match, while only needing to perform the calculations on a small number of candidate characters.

Additionally, the method can include generating a circle of diameter of the approximate stroke width around the few candidate characters. The result may be similar to that of performing a complete template outline test on the reduced point count centerline. The method can include keeping track of the local slope of the centerline and generating a vector perpendicular to each point in the centerline and measuring how far the character boundary is at that point. The slope method may be even faster than the circle method. Additionally or alternatively, other methods of determining the quality of a test point within an unknown character can be utilized.

In addition to OCRB font, the method described herein can be applied to other fonts as well. The invention can be used with human-readable digits below an EAN/UPC symbols as well as with OCR reading applications, such as passport and license plate reading.

Figure 2:
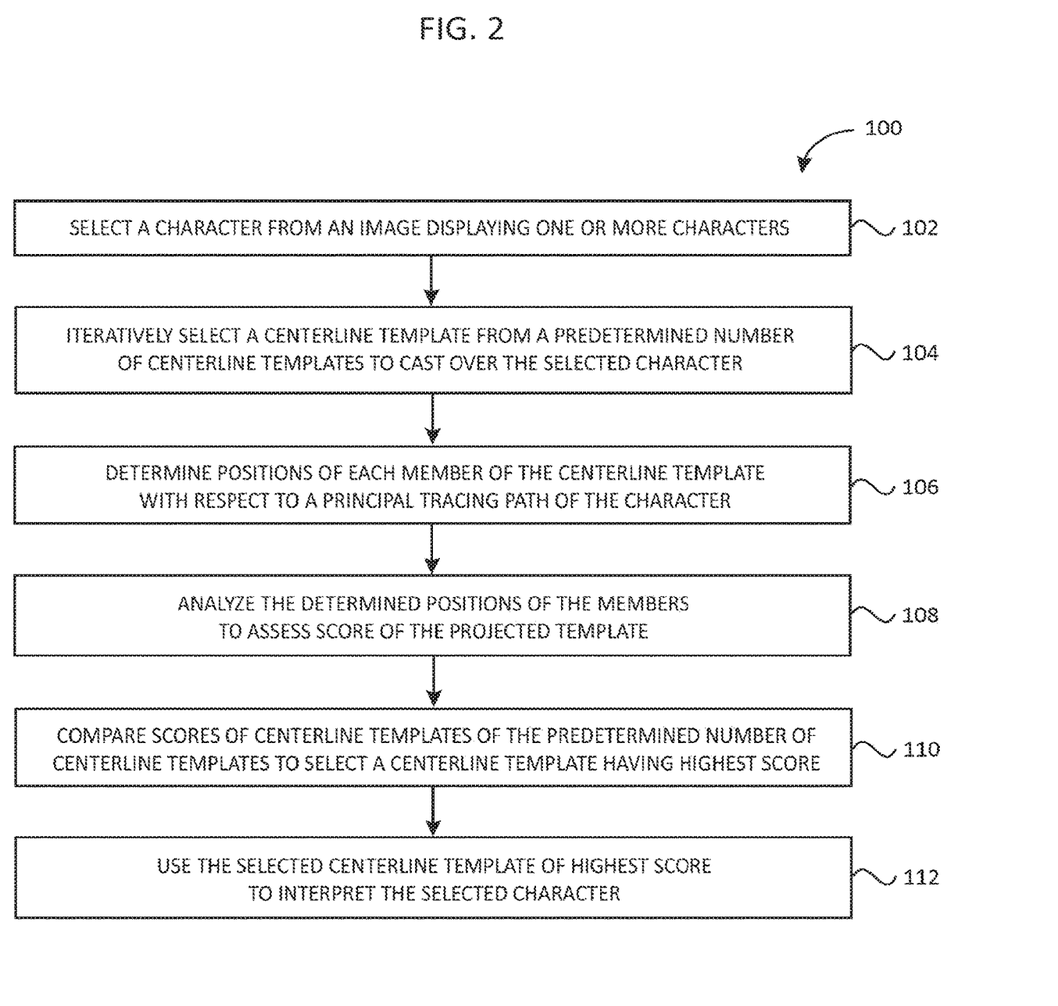
FIG. 2 schematically depicts a method for character interpretation, according to an embodiment.

FIG. 2 shows a method 100 for character interpretation, according to an embodiment. At 102, a character is selected from an image displaying one or more characters. At 104, a centerline template is iteratively selected from a predetermined number of centerline templates to cast over the selected character. At 106, positions of each member of the centerline template are determined with respect to a principal tracing path of the character. At 108, the determined positions of the members are analyzed to assess score of the projected template. At 110, scores of centerline templates of the predetermined number of centerline templates are compared to select a centerline template having highest score. And at 112, the selected centerline template of highest score is used to interpret the selected character.

In an embodiment, assessing score at 108 can include calculating proximity of the centerline template members to a center of the principal tracing path. Additionally or alternatively, assessing score at 108 can include calculating proximity of the centerline template members to one or more boundaries of the character. Additionally or alternatively, assessing score at 108 can include determining a distance to one or more boundaries of the character with respect to series of rays emanating outwards from one or more points.

Figure 3:
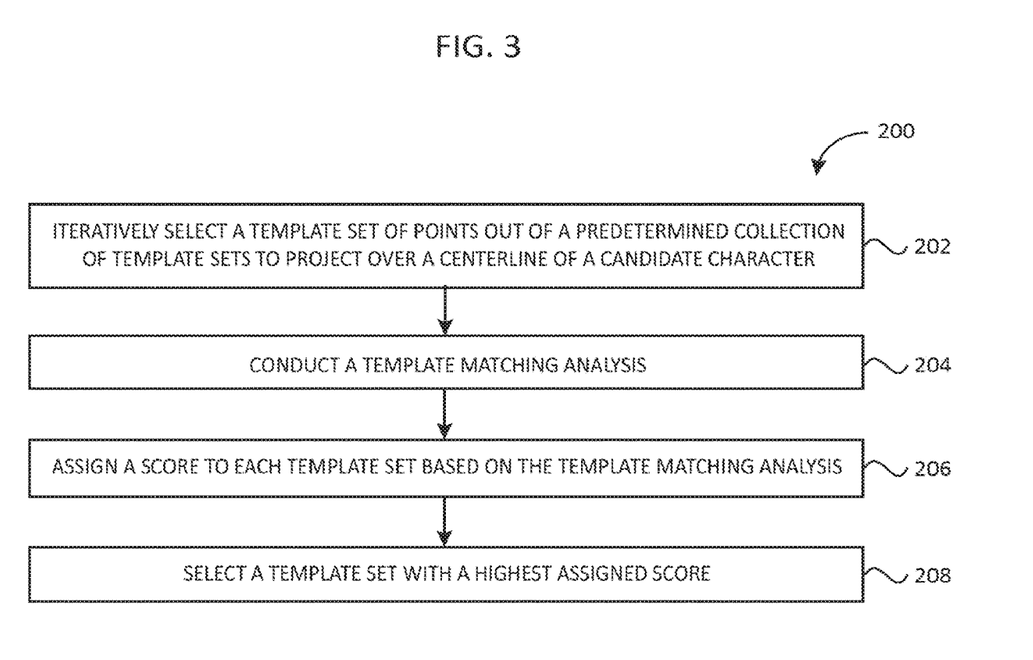
FIG. 3 schematically depicts a method for template matching, according to an embodiment.

FIG. 3 shows a method 200 for template matching, according to an embodiment. At 202, a template set of points is iteratively selected out of a predetermined collection of template sets to project over a centerline of a candidate character. At 204, a template matching analysis is conducted. At 206, a score is assigned to each template set based on the template matching analysis. And at 208, a template set with a highest assigned score is selected.

In an embodiment, conducting a template matching analysis at 204 can include counting a number of points overlapping with a printing of the candidate character, and/or calculating proximity of the overlapping points to a boundary of the printing.

In an embodiment, projecting a template set of points can include projecting a template set having a point spacing of about one-sixth of a height of the candidate character. Other point densities can be used as well, depending on an embodiment. Projecting a template set of points can include projecting a template set having uniform point spacing throughout the character as shown in FIG. 1B, or a template set having non-uniform point spacing. For example, a template set with non-uniform point spacing can have more points localized on one or more curved lines of the template set, and fewer points localized on one or more straight lines of the template set. In an embodiment, a template set can include about 20 points.

In an embodiment, the method 200 can further include selecting one or more template sets having highest assigned scores to analyze proximity of one or more template set points to a boundary of the printing of the candidate character.

Figure 4:
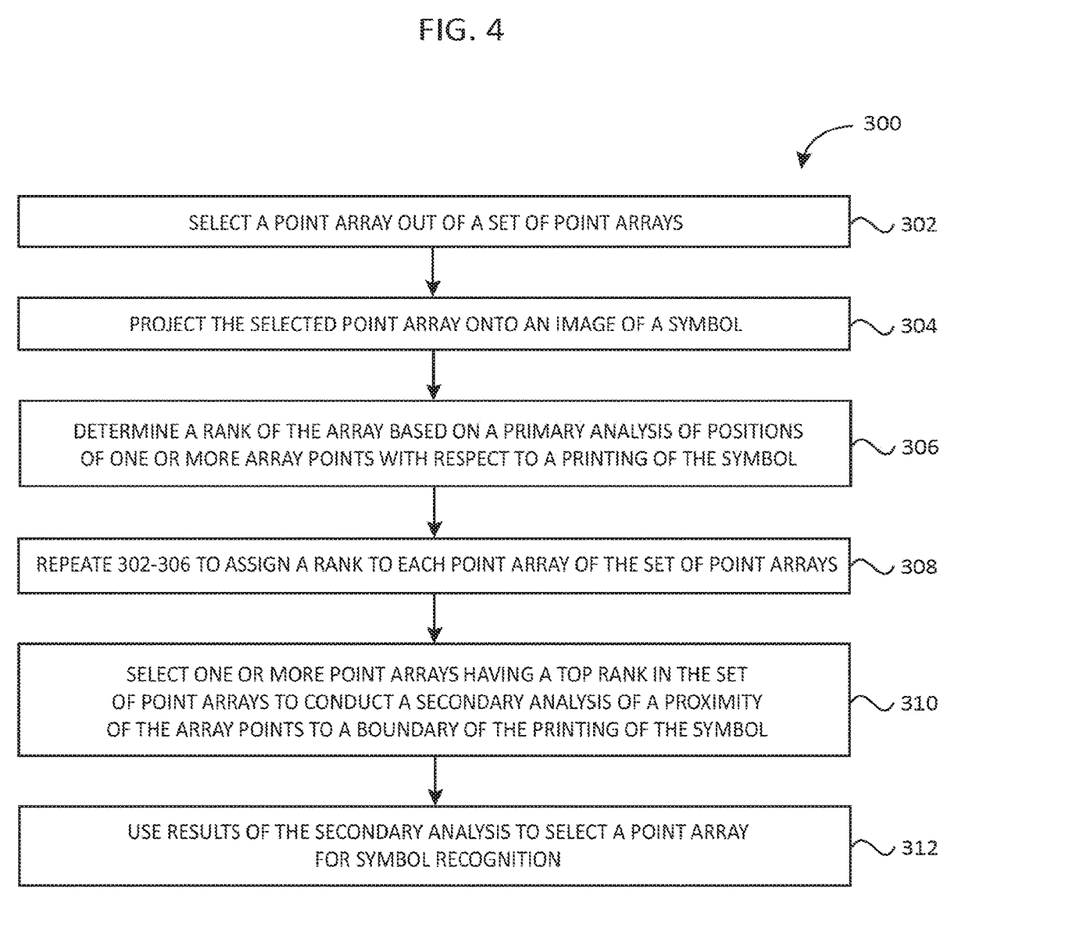
FIG. 4 schematically depicts a method for symbol recognition, according to an embodiment.

FIG. 4 shows a method 300 for symbol recognition, according to an embodiment. At 302, a point array is selected out of a set of point arrays. At 304, the selected point array is projected onto an image of a symbol. At 306, a rank of the array is determined based on a primary analysis of positions of one or more array points with respect to a printing of the symbol. At 308, 302-306 are repeated to assign a rank to each point array of the set of point arrays. At 310, one or more point arrays having a top rank in the set of point arrays are selected to conduct a secondary analysis of proximity of the array points to a boundary of the printing of the symbol. And at 312, results of the secondary analysis are used to select a point array for symbol recognition.

In an embodiment, determining a rank at 306 can include determining a number of the array points overlapping with the printing of the symbol. Additionally, the method 300 can further include determining the rank based on proximity of one or more array points to the boundary of the printing of the symbol.

In an embodiment, conducting a secondary analysis at 310 can include projecting a circle having a diameter of an approximate stroke width of the symbol around one or more points. Additionally or alternatively, conducting a secondary analysis at 310 can include generating a vector perpendicular to one or more points of the point array and measuring proximity of such points to the boundary of the printing of the symbol.

In an embodiment, the method 300 can further include applying the point array with a top rank for monospace font character recognition. For example, the method can further include applying the point array with a top rank for OCRB font character recognition.

Device and method components are meant to show only those specific details that are pertinent to understanding the embodiments of the present disclosure so as not to obscure the disclosure with details that will be readily apparent to those of ordinary skill in the art having the benefit of the description herein. In various embodiments, the sequence in which the elements of appear in exemplary embodiments disclosed herein may vary. Two or more method steps may be performed simultaneously or in a different order than the sequence in which the elements appear in the exemplary embodiments.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. No. 8,727,223; U.S. Pat. No. D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;

U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;

U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for template matching, the method comprising:
   iteratively selecting a template set of points out of a predetermined collection of template sets to project over a centerline of a candidate character;
   conducting a template matching analysis for the template set of points by at least counting a number of points that overlap with the candidate character and calculating a distance from each of the number of points that overlap with the candidate character to a boundary of the candidate character;
   assigning a score to each template set based on the template matching analysis; and
   selecting a template set with a highest assigned score.

2. The method according to claim 1, wherein projecting a template set of points includes projecting a template set having a point spacing of about one-sixth of a height of the candidate character.

3. The method according to claim 1, wherein projecting a template set of points includes projecting a template set having uniform point spacing.

4. The method according to claim 1, wherein projecting a template set of points includes projecting a template set having non-uniform point spacing.

5. The method according to claim 4, wherein projecting a template set having non-uniform spacing includes projecting a template set having more points localized on one or more curved lines and less points localized on one or more straight lines.

6. The method according to claim 1, wherein projecting a template set includes projecting 20 points.

7. The method according to claim 1, further including selecting one or more template sets having highest assigned scores to analyze proximity of one or more template set points to a boundary of the candidate character.

8. An apparatus comprising:
   a processor and a non-transitory memory including program code, the non-transitory memory and the program code configured to, with the processor, cause the apparatus to at least:
      iteratively select a template set of points out of a predetermined collection of template sets to project over a centerline of a candidate character;
      conduct a template matching analysis for the template set of points by at least counting a number of points that overlap with the candidate character and calculating a distance from each of the number of points that overlap with the candidate character to a boundary of the candidate character;
      assign a score to each template set based on the template matching analysis; and
      select a template set with a highest assigned score.

9. The apparatus according to claim 8, wherein the at least one non-transitory memory and the program code that is configured to, with the processor, cause the apparatus to project a template set of points by projecting a template set having a point spacing of about one-sixth of a height of the candidate character.

10. The apparatus according to claim 8, wherein the at least one non-transitory memory and the program code that is configured to, with the processor, cause the apparatus to project a template set of points by projecting a template set having uniform point spacing.

11. The apparatus according to claim 8, wherein the at least one non-transitory memory and the program code that is configured to, with the processor, cause the apparatus to project a template set of points by projecting a template set having non-uniform point spacing.

12. The apparatus according to claim 11, wherein the at least one non-transitory memory and the program code that is configured to, with the processor, cause the apparatus to project a template set having non-uniform spacing by projecting a template set having more points localized on one or more curved lines and less points localized on one or more straight lines.

13. The apparatus according to claim 8, wherein projecting a template set includes projecting 20 points.

14. The apparatus according to claim 8, wherein the at least one non-transitory memory and the program code that is configured to, with the processor, cause the apparatus to select one or more template sets having highest assigned scores to analyze proximity of one or more template set points to a boundary of the candidate character.

15. A computer program product comprising at least one nontransitory computer-readable storage medium having computer-readable program code portions stored therein, the computer-readable program code portions comprising an executable portion configured to:
   iteratively select a template set of points out of a predetermined collection of template sets to project over a centerline of a candidate character;
   conduct a template matching analysis for the template set of points by at least counting a number of points that overlap with the candidate character and calculating a distance from each of the number of points that overlap with the candidate character to a boundary of the candidate character;
   assign a score to each template set based on the template matching analysis; and
   select a template set with a highest assigned score.

16. The computer program product according to claim 15, wherein the computer-readable program code portions comprising the executable portion are configured to project a template set of points by projecting a template set having a point spacing of about one-sixth of a height of the candidate character.

17. The computer program product according to claim 15, wherein the computer-readable program code portions comprising the executable portion are configured to project a template set of points by projecting a template set having uniform point spacing.

18. The computer program product according to claim 15, wherein the computer-readable program code portions comprising the executable portion are configured to project a template set of points by projecting a template set having non-uniform point spacing.

19. The computer program product according to claim 18, wherein the computer-readable program code portions comprising the executable portion are configured to project a template set having non-uniform spacing by projecting a template set having more points localized on one or more curved lines and less points localized on one or more straight lines.

20. The computer program product according to claim 15, wherein the computer-readable program code portions comprising the executable portion are further configured to select one or more template sets having highest assigned scores to analyze proximity of one or more template set points to a boundary of the candidate character.

\* \* \* \* \*